US012236391B2

(12) United States Patent
Matsushita et al.

(10) Patent No.: US 12,236,391 B2
(45) Date of Patent: Feb. 25, 2025

(54) MANAGEMENT APPARATUS, MANAGEMENT METHOD AND MOBILE OBJECT

(71) Applicant: TOYOTA JIDOSHA KABUSHIKI KAISHA, Toyota (JP)

(72) Inventors: Makoto Matsushita, Ichinomiya (JP); Hiroe Fukui, Toyohashi (JP); Naoki Uenoyama, Kasugai (JP); Hikaru Gotoh, Nagoya (JP); Satoshi Komamine, Nagoya (JP); Takanori Sasano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 18/107,148

(22) Filed: Feb. 8, 2023

(65) Prior Publication Data
US 2023/0252402 A1      Aug. 10, 2023

(30) Foreign Application Priority Data

Feb. 10, 2022   (JP) ................................. 2022-019763

(51) Int. Cl.
G06Q 10/20       (2023.01)
B60P 3/07        (2006.01)
G05D 1/00        (2006.01)
G06Q 10/0835     (2023.01)

(52) U.S. Cl.
CPC .......... G06Q 10/08355 (2013.01); B60P 3/07 (2013.01); G05D 1/0212 (2013.01); G06Q 10/20 (2013.01)

(58) Field of Classification Search
CPC ..... G06Q 10/08355; G06Q 10/20; B60P 3/07; G05D 1/0212
USPC ................................. 705/338, 337, 7.11, 1.1
See application file for complete search history.

(56) References Cited

U.S. PATENT DOCUMENTS

| 2017/0184407 | A1* | 6/2017 | Yamashiro | ........... G09B 29/106 |
| 2019/0197472 | A1 | 6/2019 | Matsuoka et al. | |
| 2019/0227551 | A1* | 7/2019 | Igata | ...................... G06Q 20/20 |
| 2021/0116924 | A1 | 4/2021 | Etou | |

FOREIGN PATENT DOCUMENTS

| CN | 107058097 A | * | 8/2017 | ............ C12M 23/12 |
| JP | 3561547 B2 | * | 9/2004 | |
| JP | 2019-117461 A | | 7/2019 | |
| JP | 2020-090151 A | | 6/2020 | |
| JP | 2020135500 A | | 8/2020 | |
| JP | 2021062968 A | | 4/2021 | |
| WO | WO-0055828 A1 | * | 9/2000 | ............ G08C 17/02 |

* cited by examiner

Primary Examiner — Akiba K Robinson
(74) Attorney, Agent, or Firm — Dinsmore & Shohl LLP

(57) ABSTRACT

A management apparatus includes a controller configured to manage a storage mobile object that is configured to store a stored mobile object. The stored mobile object includes a first mobile object that is stored in the storage mobile object and a second mobile object that is not stored in the storage mobile object. The controller is configured to instruct the storage mobile object to transport the first mobile object while maintaining the first mobile object.

20 Claims, 4 Drawing Sheets

MANAGEMENT APPARATUS, MANAGEMENT METHOD AND MOBILE OBJECT

CROSS-REFERENCE TO RELATED APPLICATION

This application claims priority to Japanese Patent Application No. 2022-19763, filed on Feb. 10, 2022, the entire contents of which are incorporated herein by reference.

TECHNICAL FIELD

The present disclosure relates to a management apparatus, a management method, and a mobile object.

BACKGROUND

Delivery vehicles that store and travel with delivery mobile objects are known. For example, see Patent Literature (PTL) 1.

CITATION LIST

Patent Literature

PTL 1: JP 2020-135500 A

SUMMARY

In systems that operate mobile objects, the need for maintenance of mobile objects reduces the utilization rate of the mobile objects. The utilization rate of mobile objects may decrease due to a mobile object becoming unable to move and interfering with mobile objects in operation. Demand exists for improvement in the utilization rate of mobile objects.

It would be helpful to improve the utilization rate of mobile objects.

A management apparatus according to an embodiment of the present disclosure includes a controller configured to manage a storage mobile object that is configured to store a stored mobile object. The stored mobile object includes a first mobile object that is stored in the storage mobile object and a second mobile object that is not stored in the storage mobile object. The controller is configured to instruct the storage mobile object to transport the first mobile object while maintaining the first mobile object.

A management method according to an embodiment of the present disclosure is a management method for managing a storage mobile object configured to store a stored mobile object, the management method including instructing the storage mobile object to transport a first mobile object stored in the storage mobile object while maintaining the first mobile object.

A mobile object according to an embodiment of the present disclosure includes a storage configured to store a stored mobile object, and a controller. The storage is configured to maintain the stored mobile object while storing the stored mobile object. The controller is configured to control the mobile object to transport the stored mobile object that is stored in the storage while maintaining the stored mobile object.

According to a management apparatus, a management method, and a mobile object according to embodiments of the present disclosure, the utilization rate of mobile objects can be improved.

DETAILED DESCRIPTION (Example Configuration of Management System 1)

Figure 1:
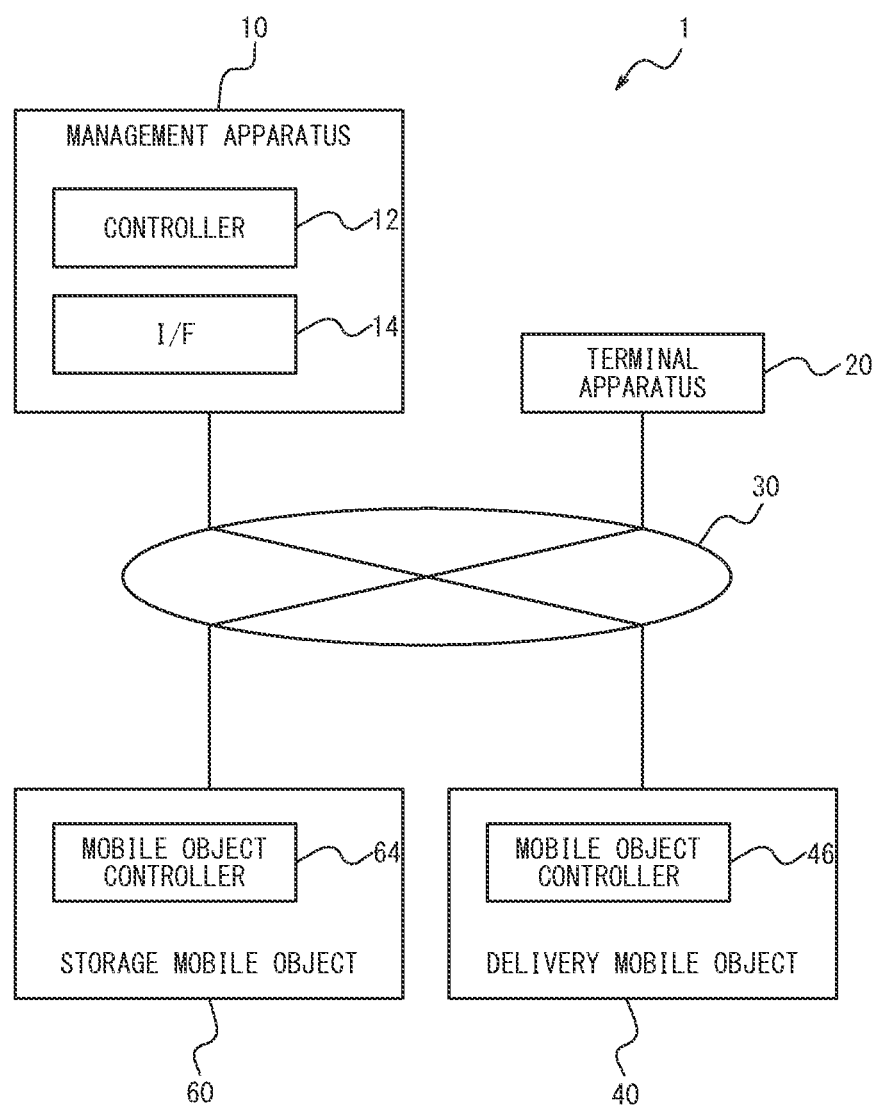
FIG. 1 is a block diagram illustrating an example configuration of a management system according to an embodiment.

As illustrated in FIG. 1, a management system 1 according to an embodiment includes a management apparatus 10, a delivery mobile object 40, and a storage mobile object 60. The management system 1 further includes a non-essential terminal apparatus 20. The storage mobile object 60 is configured to store the delivery mobile object 40. The storage mobile object 60 is also configured so that, while the delivery mobile object 40 is being stored inside, maintenance work can be performed inside on the delivery mobile object 40. Each component of the management system 1 is described below.

<Management Apparatus 10>

The management apparatus 10 manages the operation of the storage mobile object 60. The management apparatus 10 may further manage the operation of the delivery mobile object 40. The management apparatus 10 includes a controller 12 and an interface 14. The interface 14 is also referred to as an I/F 14.

The controller 12 controls at least one component of the management apparatus 10. The controller 12 may be configured to include at least one processor. The "processor" is a general purpose processor, a dedicated processor specialized for specific processing, or the like in the present embodiment but is not limited to these. The controller 12 may be configured to include at least one dedicated circuit. The dedicated circuit may include, for example, a field-programmable gate array (FPGA) or an application specific integrated circuit (ASIC). The controller 12 may be configured with the dedicated circuit instead of the processor, or may be configured with the dedicated circuit along with the processor.

The management apparatus 10 may further include a memory. The memory is a semiconductor memory, a magnetic memory, an optical memory, or the like, for example, but is not limited to these. The memory may function, for example, as a main memory, an auxiliary memory, or a cache memory. The memory may include an electromagnetic storage medium, such as a magnetic disk. The memory may include a non-transitory computer readable medium.

The memory stores any information used for operation of the management apparatus 10. For example, the memory may store a system program, an application program, or the like. The memory may be included in the controller 12.

Information, data, or the like is outputted from and inputted to the controller 12 through the I/F 14. The I/F 14 may include a communication module for communication with other devices, such as the storage mobile object 60, the delivery mobile object 40, or the terminal apparatus 20, via a network 30. The communication module may be, for example, compliant with a mobile communication standard, such as the 4th Generation (4G) standard or the 5th Generation (5G) standard. The communication module may be compliant with a communication standard, such as a Local Area Network (LAN). The communication module may be compliant with a wired or wireless communication standard. The communication module is not limited to these examples and may be compliant with various communication standards. The I/F 14 may be configured to be connected to the communication module.

The I/F 14 may be configured with an input device for receiving inputs, such as information or data, from a user. The input device may be configured with, for example, a touch panel, a touch sensor, or a pointing device such as a mouse. The input device may be configured with a physical key. The input device may be configured with an audio input device, such as a microphone.

The I/F 14 may be configured to include an output device that outputs information, data, or the like to the user. The output device may include, for example, a display device that outputs visual information, such as images, characters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information, such as voice. The output device is not limited to the above examples and may include various other devices.

The management apparatus 10 may include a single server apparatus, or multiple server apparatuses capable of communicating with each other.

<Delivery Mobile Object 40>

Figure 2:
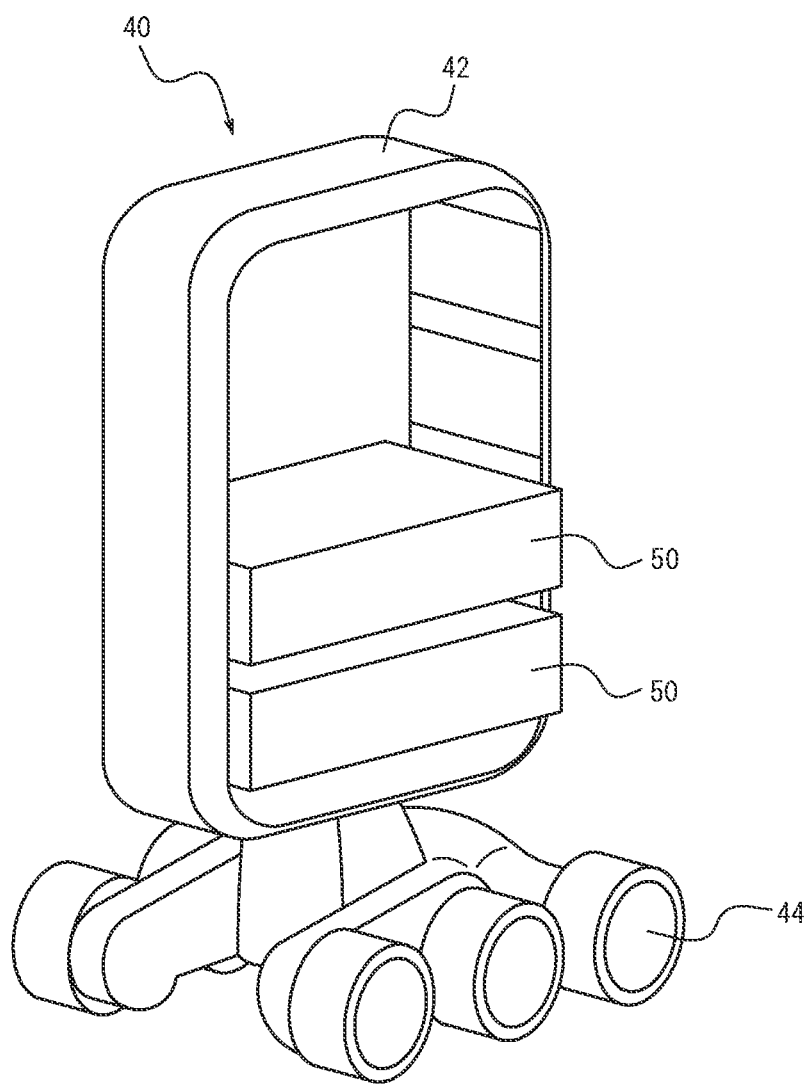
FIG. 2 is a schematic diagram illustrating an example configuration of a delivery mobile object.

As illustrated in FIG. 2, the delivery mobile object 40 includes a body 42 with a storage space for storing delivery articles 50, which are articles to be delivered, and a driver 44 for moving the delivery mobile object 40. The storage space of the body 42 may be configured to store delivery articles 50 packed in delivery boxes or the like or may be configured to store delivery articles 50 that are not packed in delivery boxes or the like. The body 42 may be equipped with a locking mechanism configured to lock the delivery articles 50 stored in the storage space. The driver 44 may, for example, include wheels or caterpillars as a mechanism for traveling on a road surface. The driver 44 may further include a drive mechanism such as a motor or engine that drives the wheels, caterpillars, or the like. The driver 44 may further include components such as gears that transmit power from the drive mechanism to the wheels, caterpillars, or the like. The driver 44 may further include a battery to supply power or a tank to supply fuel to the drive mechanism.

As illustrated in FIG. 1, the delivery mobile object 40 further includes a non-essential mobile object controller 46. The mobile object controller 46 controls at least one component of the delivery mobile object 40, such as the body 42 or driver 44 of the delivery mobile object 40. The mobile object controller 46 may acquire destination information specifying a destination from the management apparatus 10 and control the driver 44 to travel autonomously based on the destination information. The delivery mobile object 40 may acquire control information indicating the timing at which to start or stop traveling, the travel speed, or the like from the management apparatus 10 and control the driver 44 to travel based on the control information. In a case in which a delivery article 50 is stored in the body 42, the mobile object controller 46 may output information identifying the stored delivery article 50 to the management apparatus 10. In a case in which a delivery article 50 is removed from the body 42, the mobile object controller 46 may output information identifying the removed delivery article 50 to the management apparatus 10.

The mobile object controller 46 may be configured to include at least one processor. The mobile object controller 46 may be configured to include one or more dedicated circuits instead of the processor, or may be configured to include a dedicated circuit along with the processor. The delivery mobile object 40 may be configured to include a memory. The memory of the delivery mobile object 40 may be configured to be identical or similar to the memory of the management apparatus 10. The delivery mobile object 40 may be configured to include an I/F or a communication module. The I/F or communication module of the delivery mobile object 40 may be configured to be identical or similar to the I/F or communication module of the management apparatus 10.

The delivery mobile object 40 may be configured to include a positional information detector that acquires the positional information for the delivery mobile object 40 itself. The delivery mobile object 40 may output the positional information for the delivery mobile object 40 itself to the management apparatus 10. The positional information detector may be configured to include a receiver compliant with a satellite positioning system. The receiver compliant with the satellite positioning system may include, for example, a Global Positioning System (GPS) receiver.

The number of delivery mobile objects 40 is not limited to one and may be two or more. The delivery mobile object 40 is not limited to the configuration illustrated in FIG. 2 but may be configured in a variety of other ways to store the delivery article 50 and move.

The mobile object controller 46 may acquire detection results regarding the state of the delivery mobile object 40 from various sensors installed in the delivery mobile object 40. The mobile object controller 46 may acquire the state of the delivery mobile object 40 based on sensor detection results. The mobile object controller 46 may estimate the state of the delivery mobile object 40. The mobile object controller 46 may, for example, estimate whether the delivery mobile object 40 is ready to travel as the state of the delivery mobile object 40. The mobile object controller 46 may estimate whether the delivery mobile object 40 is dirty or wet as the state of the delivery mobile object 40. The mobile object controller 46 may estimate whether at least a portion of the configuration of the delivery mobile object 40 has failed as the state of the delivery mobile object 40. The mobile object controller 46 may output information representing the state of the delivery mobile object 40 to the management apparatus 10.

The information representing the state of the delivery mobile object 40 includes information indicating that the delivery mobile object 40 is in a state requiring maintenance. The delivery mobile object 40 can require maintenance in states such as damage or inoperability of the body 42 or driver 44, or a low battery state of charge or low fuel.

The mobile object controller 46 may determine that the delivery mobile object 40 is in a state requiring maintenance in a case in which the delivery mobile object 40 is unable to move normally from its location and cannot deliver the delivery article 50 that is being delivered. The mobile object controller 46 may determine that the delivery mobile object 40 is in a state requiring maintenance in a case in which, for example, the delivery mobile object 40 is stopped, the travel speed of the delivery mobile object 40 has dropped by a predetermined percentage from the normal speed, or traveling would place the delivery mobile object 40 in a dangerous state. The mobile object controller 46 may determine that the delivery mobile object 40 is in a state requiring maintenance in a case in which the remaining battery level or fuel level in the delivery mobile object 40 is equal to or less than a predetermined amount. The mobile object controller 46 may determine whether the delivery mobile object 40 is in a state requiring maintenance based on various states of the delivery mobile object 40.

<Storage Mobile Object 60>

Figure 3:
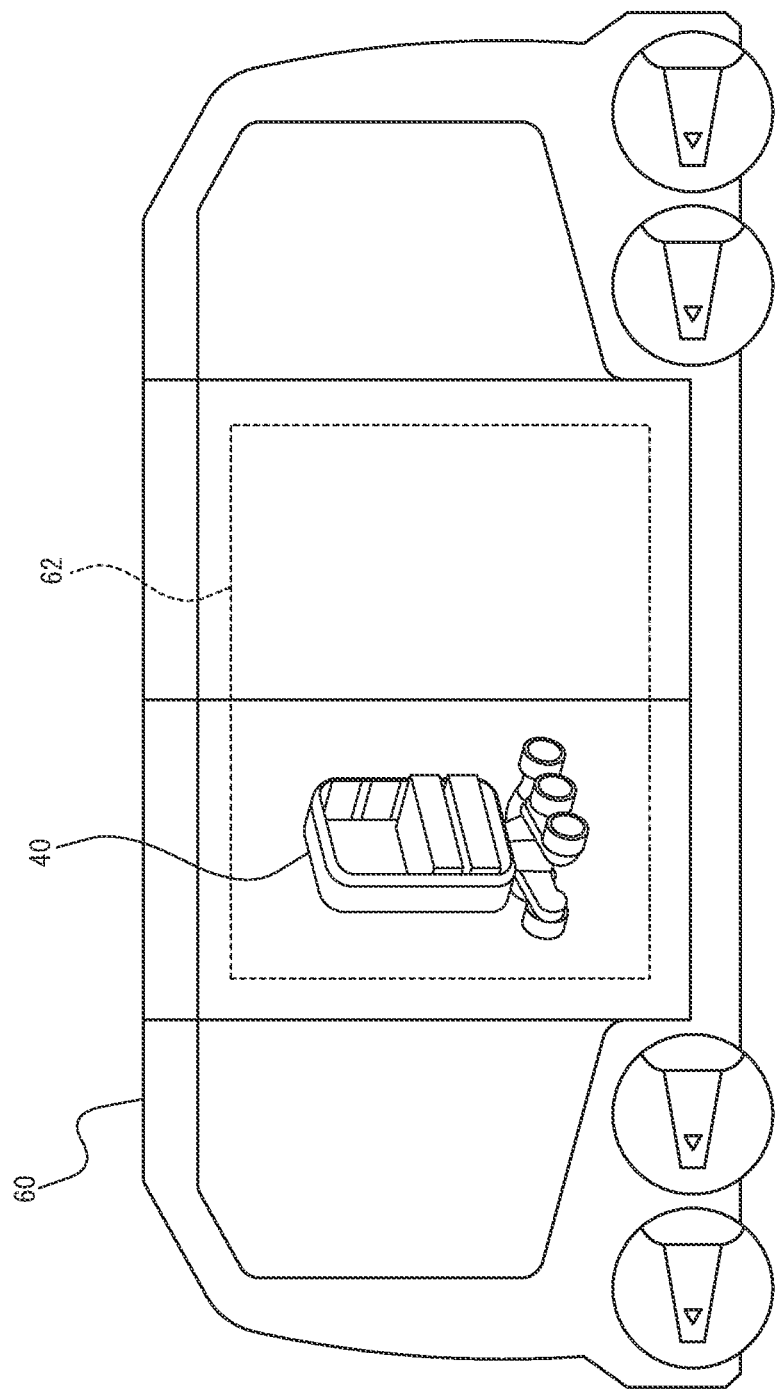
FIG. 3 is a schematic diagram illustrating an example configuration of a storage mobile object.

The storage mobile object 60 includes a storage 62 configured to store the delivery mobile object 40 as illustrated in FIG. 3. The delivery mobile object 40 is also referred to as a stored mobile object because it is stored in the storage mobile object 60. A delivery mobile object 40 that is stored in the storage mobile object 60 is also referred to as a first mobile object. A delivery mobile object 40 that is not stored in the storage mobile object 60 is also referred to as a second mobile object. Second mobile objects are divided into delivery mobile objects 40 that require maintenance and delivery mobile objects 40 that do not require maintenance.

The storage 62 is configured to enable maintenance of a stored delivery mobile object 40 while the delivery mobile object 40 is being stored. The storage 62 may, for example, be equipped with tools or equipment used to maintain the delivery mobile object 40. The storage 62 may be configured to enable workers who maintain the delivery mobile object 40 to be aboard.

The storage mobile object 60 further includes a mobile object controller 64 as illustrated in FIG. 1. The mobile object controller 64 controls travel of the storage mobile object 60. The mobile object controller 64 may also control the maintenance work on the delivery mobile object 40 stored in the storage 62. Specifically, the mobile object controller 64 may control maintenance tools or maintenance equipment in the storage 62. The mobile object controller 64 may notify the workers aboard the storage 62 of the content of maintenance work.

The mobile object controller 64 may be configured to include at least one processor. The mobile object controller 64 may be configured to include one or more dedicated circuits instead of the processor, or may be configured to include a dedicated circuit along with the processor. The storage mobile object 60 may be configured to include a memory. The memory of the storage mobile object 60 may be configured to be identical or similar to the memory of the management apparatus 10. The storage mobile object 60 may be configured to include an I/F or a communication module. The I/F or communication module of the storage mobile object 60 may be configured to be identical or similar to the I/F or communication module of the management apparatus 10.

<Terminal Apparatus 20>

The terminal apparatus 20 may accept input of information, from the user who ships the delivery article 50, specifying the place or time to ship the delivery article 50 and may output the inputted information to the management apparatus 10. The terminal apparatus 20 may accept input of information, from the user who receives the delivery article 50, specifying the place or time to receive the delivery article 50 and may output the inputted information to the management apparatus 10. The terminal apparatus 20 may acquire information about the delivery status of the delivery article 50 from the management apparatus 10 and notify the user who shipped the delivery article 50 or the user who is to receive the delivery article 50 of the delivery status.

The terminal apparatus 20 may be configured to include one or more processors or one or more dedicated circuits. The terminal apparatus 20 may be configured to include a memory. The memory of the terminal apparatus 20 may be configured to be identical or similar to the memory of the management apparatus 10. The terminal apparatus 20 may be configured to include an I/F or a communication module. The I/F or communication module of the terminal apparatus 20 may be configured to be identical or similar to the I/F or communication module of the management apparatus 10.

The terminal apparatus 20 may be configured to include an input device for receiving inputs, such as information or data, from the user. The input device may be configured to include the various devices described as the I/F 14. The terminal apparatus 20 may be configured to include an output device that outputs information, data, or the like to the user. The output device may be configured to include the various devices described as the I/F 14.

The number of terminal apparatuses 20 included in the management system 1 is not limited to one and may be two or more. The terminal apparatus 20 may be configured as a mobile terminal, such as a smartphone or a tablet, or a Personal Computer (PC), such as a notebook PC or a tablet PC. The terminal apparatus 20 is not limited to the above examples and may include various devices.

(Operation Example of Management System 1)

In the management system 1 according to the present embodiment, the management apparatus 10 manages the operation of the storage mobile object 60 and the delivery mobile object 40. As described below, the delivery mobile object 40 operates so as to deliver the delivery article 50 from the delivery source to the delivery destination. The storage mobile object 60 operates so as to store a delivery mobile object 40 to be maintained or to transport the delivery mobile object 40 when maintenance becomes necessary for the delivery mobile object 40. Specific examples of management are described below.

<Management of Delivery Mobile Object 40>

The management apparatus 10 manages the operation of the delivery mobile object 40 so that the delivery mobile object 40 stores the delivery article 50 at the delivery source and delivers the delivery article 50 to the delivery destination. In a case in which the delivery mobile object 40 is not storing any delivery articles 50 or has the capacity to store another delivery article 50, the management apparatus 10 designates the delivery source of the delivery article 50 as the destination of the delivery mobile object 40 so that the delivery mobile object 40 stores the delivery article 50. In a case in which the delivery mobile object 40 has stored the delivery article 50, the management apparatus 10 designates the delivery destination of the delivery article 50 as the destination of the delivery mobile object 40 so that the delivery mobile object 40 delivers the stored delivery article 50.

The delivery source includes the location from which the delivery article 50 is shipped. The delivery article 50 may be shipped from the user, such as a corporation or individual, or from a distribution center or the like that has collected the delivery article 50. The delivery destination includes the location at which the delivery article 50 is to be received. The delivery article 50 may be received by a user, such as a corporation or individual, or by a distribution center or the like that collects the delivery article 50. These examples are not limiting, and the delivery source or destination may include a variety of locations. The management apparatus 10 plans and manages the operation of the delivery mobile objects 40 so that the number of delivery articles 50 handled for pickup or delivery increases.

The greater the number of delivery mobile objects 40 in operation, the more delivery articles 50 can be handled. Also, the longer each delivery mobile object 40 operates, the more delivery articles 50 can be handled. In other words, the higher the utilization rate of the delivery mobile objects 40, the more delivery articles 50 can be handled. The management apparatus 10 manages the operation of the delivery mobile objects 40 so as to increase the utilization rate of the delivery mobile objects 40.

The management apparatus 10 manages the state of the delivery mobile object 40 in order to manage the operation of the delivery mobile object 40. The state of the delivery mobile object 40 includes whether the delivery mobile object 40 is in a state requiring maintenance. The state of the delivery mobile object 40 may include the number, weight, or type of the delivery articles 50 stored in the delivery mobile object 40, the delivery location, the delivery time, or the like.

<Management of Storage Mobile Object 60>

In a case in which a delivery mobile object 40 requires maintenance, the controller 12 of the management apparatus 10 plans the maintenance of the delivery mobile object 40. Performance of maintenance on the delivery mobile object 40 reduces the utilization rate of the delivery mobile object 40. The controller 12 may plan maintenance on the delivery mobile object 40 so as to maintain or increase the utilization rate of the delivery mobile object 40. The controller 12 manages the operation of the storage mobile object 60 so that the delivery mobile object 40 is stored in the storage mobile object 60 and is maintained while stored in the storage mobile object 60. The controller 12 also controls the storage mobile object 60 to transport the delivery mobile object 40 closer to the destination of the delivery mobile object 40 while maintaining the delivery mobile object 40. In other words, the controller 12 instructs the storage mobile object 60 to transport the delivery mobile object 40 while maintaining the delivery mobile object 40. The destination of the delivery mobile object 40 may include the delivery source or the delivery destination for delivery by the delivery mobile object 40. By the delivery mobile object 40 being transported while being maintained, the distance traveled by the delivery mobile object 40 is reduced. The reduction in travel distance could increase the utilization rate of the delivery mobile object 40.

The maintenance work on the delivery mobile object 40 in the storage mobile object 60 may, for example, be repair of the delivery mobile object 40, replacement of parts, charging or fueling, or the like.

The storage mobile object 60 may unload the maintained delivery mobile object 40 (first mobile object) at a predetermined location and deploy the delivery mobile object 40 as a second mobile object. In other words, the controller 12 may instruct the storage mobile object 60 to unload and deploy the maintained delivery mobile object 40 at a predetermined location. The controller 12 may determine the predetermined location based on the delivery source or delivery destination in a case in which the deployed delivery mobile object 40 (second mobile object) is to deliver the delivery article 50. In this way, the delivery mobile object 40 can resume operations near the location to which the delivery mobile object 40 needs to travel for the delivery operation. As a result, the utilization rate of the delivery mobile object 40 can be increased.

The controller 12 may control the storage mobile object 60 to transport the delivery mobile object 40, which is to be deployed at a predetermined location to perform the delivery operation, while storing and maintaining the delivery mobile object 40. The controller 12 may determine the delivery mobile object 40 to be stored in the storage mobile object 60 based on information about the delivery article 50. The information about the delivery article 50 may, for example, include the size or weight of the delivery article 50, or the delivery source or delivery destination of the delivery article 50. The specifications of the body 42 of the delivery mobile object 40 indicate the size, weight, and the like of the delivery article 50 that can be stored in the body 42. The external shape of the delivery mobile object 40 or the specifications of the driver 44 indicate where the delivery mobile object 40 can travel. Based on the size or weight of the delivery article 50, the controller 12 may determine a delivery mobile object 40 with specifications enabling delivery of the delivery article 50 as the delivery mobile object 40 to be stored in the storage mobile object 60. Based on the delivery source or delivery destination of the delivery article 50, the controller 12 may determine a delivery mobile object 40 with specifications enabling travel to the delivery source or delivery destination as the delivery mobile object 40 to be stored in the storage mobile object 60. In other words, the controller 12 may determine the type of delivery mobile object 40 to be stored in the storage mobile object 60 based on information about the delivery article 50.

The number of delivery mobile objects 40 in operation is reduced by a new delivery mobile object 40 being stored in the storage mobile object 60. The controller 12 may control the storage mobile object 60 to unload and deploy a maintained delivery mobile object 40 so as to place the delivery mobile object 40 in operation in exchange for the delivery mobile object 40 to be stored in the storage mobile object 60. In other words, the controller 12 may instruct the storage mobile object 60 to unload the maintained delivery mobile object 40 (first mobile object) in exchange for storing a delivery mobile object 40 that has not been stored (second mobile object). In this way, the number of delivery mobile objects 40 can be secured. As a result, the utilization rate of the delivery mobile object 40 can be secured.

The controller 12 may instruct the storage mobile object 60 to finish maintaining the delivery mobile object 40 (first mobile object) that has been stored before storing the second mobile object. In this way, a maintained delivery mobile object 40 (first mobile object) can be immediately deployed in exchange for storing the second mobile object.

In a case in which a delivery mobile object 40 (second mobile object) about to be stored is storing a delivery article 50, the delivery article 50 is consequently stored both in the delivery mobile object 40 and the storage mobile object 60. The storage mobile object 60 may store the delivery article 50 in the delivery mobile object 40 that is to be deployed in exchange for the delivery mobile object 40 about to be stored, so as not to stop delivery of the delivery article 50. That is, the delivery article 50 may be transferred from the delivery mobile object 40 to be stored to the delivery mobile object 40 to be deployed. In other words, the controller 12 may instruct the storage mobile object 60 to store the delivery article 50, which is stored in the delivery mobile object 40 (second mobile object) that is about to be stored, in the maintained delivery mobile object 40 (first mobile object) that is to be deployed in exchange for the delivery mobile object 40 to be stored. In this way, the delivery article 50 is relayed between delivery mobile objects 40 in operation and is less likely to be stopped. As a result, the delivery efficiency can be maintained or improved.

In a case of storage of a delivery mobile object 40 (second mobile object) that has not been stored, the controller 12 may instruct the storage mobile object 60 to store a delivery mobile object 40 (second mobile object) that is not storing a delivery article 50. In this way, the delivery article 50 is less likely to be stopped. As a result, the delivery efficiency can be maintained or improved.

In a case in which maintenance becomes necessary for a delivery mobile object 40 (second mobile object) that has not been stored, there may not be a storage mobile object 60 capable of storing the delivery mobile object 40. In this case, the storage mobile object 60 may collect the delivery article 50 stored in the delivery mobile object 40 and transfer the delivery article 50 to another delivery mobile object 40. The storage mobile object 60 may store the delivery article 50 in the stored, maintained delivery mobile object 40 and deploy that delivery mobile object 40 at a predetermined location. The storage mobile object 60 may transport the collected delivery article 50 to another delivery mobile object 40 (second mobile object) that has not been stored and store the delivery article 50 in that delivery mobile object 40. In other words, in a case in which a delivery mobile object 40, among the non-stored delivery mobile objects 40 (second mobile objects), that requires maintenance cannot be stored in the storage mobile object 60, the controller 12 may instruct the storage mobile object 60 to collect a delivery article 50 stored in the delivery mobile object 40 that requires maintenance. In this way, the delivery article 50 is less likely to be stopped. As a result, the delivery efficiency can be maintained or improved.

Maintenance on the delivery mobile object 40 may become necessary during travel. The controller 12 may deploy the storage mobile object 60 in the area where a delivery mobile object 40 (second mobile object) that has not been stored is traveling. In this way, when maintenance becomes necessary for a delivery mobile object 40, the time it takes until the delivery mobile object 40 is stored in the storage mobile object 60 can be reduced. As a result, the utilization rate of the delivery mobile object 40 can be increased. The time it takes for the delivery article 50 to be collected from the delivery mobile object 40 for which maintenance is required can also be reduced. As a result, the delivery efficiency can be maintained or improved.

By virtue of being larger than the delivery mobile object 40, the storage mobile object 60 might only be able to travel in a limited area. The external size of the storage mobile object 60 that can travel in a given area may be limited. Furthermore, maintenance may become necessary for a delivery mobile object 40 in an area where only certain storage mobile objects 60 can travel. In this case, the controller 12 may select a storage mobile object 60 that can store only one delivery mobile object 40 and instruct the selected storage mobile object 60 to store the delivery mobile object 40 for which maintenance has become necessary. The controller 12 may also deploy, in a predetermined area, a storage mobile object 60 that can store only one delivery mobile object 40 (second mobile object) that travels in the predetermined area. In this way, the time it takes to store a delivery mobile object 40 for which maintenance has become necessary can be reduced. As a result, the utilization rate of the delivery mobile object 40 can be increased.

Example Procedures for Management Method

Figure 4:
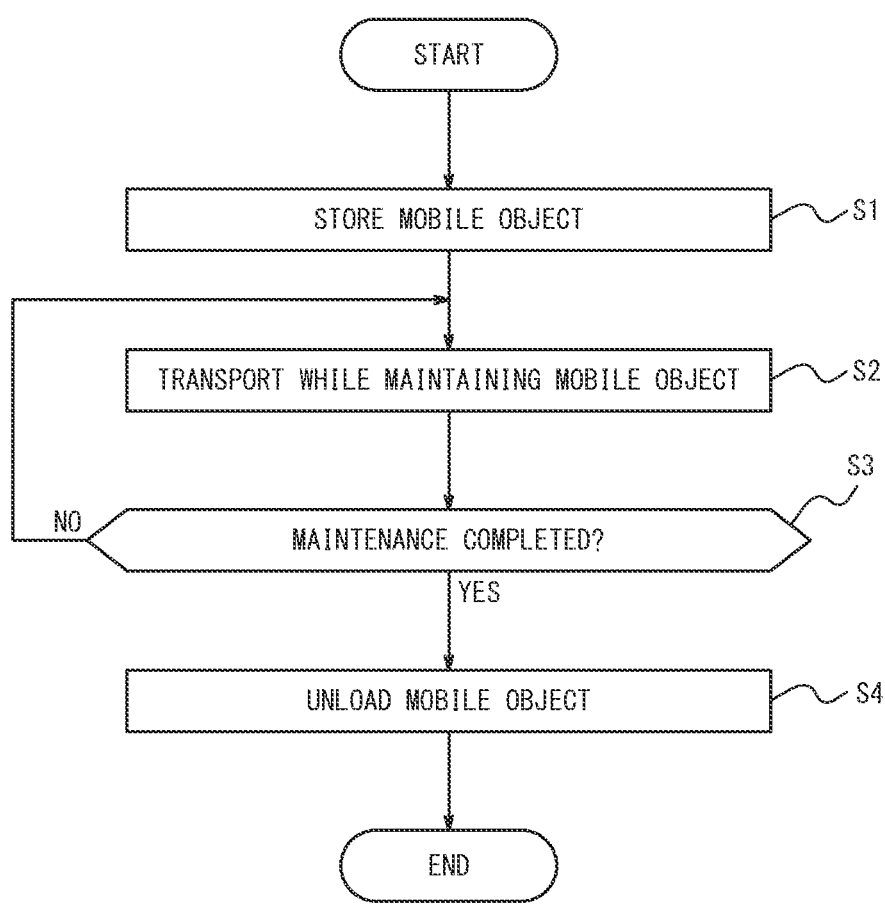
FIG. 4 is a flowchart illustrating an example procedure of a management method according to an embodiment.

As described above, according to the management apparatus 10 in the management system 1 of the present embodiment, the storage mobile object 60 can transport the delivery mobile object 40 to a predetermined location while storing and maintaining the delivery mobile object 40. The controller 12 of the management apparatus 10 may, for example, perform a management method including the procedures of the flowchart illustrated in FIG. 4. The management method may be implemented as a management program to be executed by the controller 12.

The controller 12 stores the delivery mobile object 40 in the storage mobile object 60 (step S1). The controller 12 controls the storage mobile object 60 to transport the delivery mobile object 40 while maintaining the delivery mobile object 40 (step S2). The controller 12 determines whether maintenance on the delivery mobile object 40 is completed in the storage mobile object 60 (step S3). In a case in which the maintenance on the delivery mobile object 40 is not completed (step S3: NO), the controller 12 returns to the procedure of step S2. In a case in which maintenance on the delivery mobile object 40 is completed (step S3: YES), the controller 12 unloads and deploys the maintained delivery mobile object 40 at a predetermined location (step S4). After performing the procedure of step S4, the controller 12 can end the execution of the procedures in the flowchart of FIG. 4.

<Summary>

As described above, according to the management system 1, the management apparatus 10, and management method of the present embodiment, the storage mobile object 60 can transport the delivery mobile object 40 while storing and maintaining the delivery mobile object 40. In other words, the delivery mobile object 40 is transported while being maintained. In this way, the length of time the delivery mobile object 40 spends traveling can be reduced. As a result, the utilization rate of the delivery mobile object 40 can be increased.

The storage mobile object 60 or delivery mobile object 40 is not limited to vehicles as described above but may be a mobile object of various types, such as a robot or drone. The delivery mobile object 40 is not limited to applications for delivering the delivery articles 50. The delivery mobile object 40 may be replaced by a mobile object used for purposes other than delivery applications.

While an embodiment of the present disclosure has been described with reference to the drawings and examples, it is to be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A management apparatus comprising a controller configured to manage a storage mobile object that is configured to store a stored mobile object, wherein the stored mobile object includes a first mobile object that is stored in the storage mobile object and at least one second mobile object that is not stored in the storage mobile object, and the controller is configured to control the storage mobile object to autonomously transport the first mobile object based on destination information that specifies a destination from the management apparatus while maintaining the first mobile object, the destination including a delivery destination, wherein the first mobile object acquires control information indicating a time at which to start or stop traveling and a travel speed, and is controlled by the controller to autonomously travel to the destination in accordance with the acquired control information, and the controller is configured to output information indicating that the first mobile object is in a state requiring maintenance based on a plurality of states of the first mobile objection, the plurality of states including estimating whether the first mobile object is dirty or wet, whether the travel speed has dropped by a predetermined percentage from a designated speed, and whether a state of charge or a fuel level is equal to or less than a predetermined amount.

2. The management apparatus according to claim 1, wherein the controller is configured to control the storage mobile object to unload, at a predetermined location, the first mobile object that has been maintained by the storage mobile object and deploy the first mobile object as the second mobile object.

3. The management apparatus according to claim 2, wherein the controller is configured to determine the predetermined location based on the delivery destination in a case in which the second mobile object to be deployed is to deliver a delivery article.

4. The management apparatus according to claim 3, wherein the controller is configured to determine a type of mobile object to be stored in the storage mobile object as the first mobile object based on information about the delivery article.

5. The management apparatus according to claim 2, wherein when the second mobile object is to be stored, the controller is configured to control the storage mobile object to unload the first mobile object that has been maintained in exchange for the second mobile object to be stored.

6. The management apparatus according to claim 5, wherein the controller is configured to control the storage mobile object to finish maintaining the first mobile object that has been stored before storing the second mobile object.

7. The management apparatus according to claim 5, wherein the controller is configured to control the storage mobile object to store a delivery article, which is being stored by the second mobile object to be stored, in the first mobile object that has been maintained and is to be deployed in exchange for the second mobile object to be stored.

8. The management apparatus according to claim 5, wherein the at least one second mobile object comprises a plurality of second mobile objects, and the controller is configured to control the storage mobile object to store a mobile object, among the plurality of second mobile objects, that is not storing a delivery article.

9. The management apparatus according to claim 1, wherein the at least one second mobile object comprises a plurality of second mobile objects, and in a case in which a mobile object, among the plurality of second mobile objects, that requires the maintenance cannot be stored in the storage mobile object, the controller is configured to control the storage mobile object to collect a delivery article stored in the mobile object that requires the maintenance.

10. The management apparatus according to claim 1, wherein the controller is configured to deploy the storage mobile object in an area in which the second mobile object is traveling.

11. The management apparatus according to claim 10, wherein the controller is configured to deploy a mobile object, as the storage mobile object in a predetermined area, that can store only one second mobile object traveling in the predetermined area.

12. A management method for managing a storage mobile object configured to store a stored mobile object, the management method comprising:

controlling the storage mobile object to autonomously transport a first mobile object stored in the storage mobile object based on destination information that specifies a destination from a management apparatus including the first mobile object while maintaining the first mobile object, the management apparatus comprising the stored mobile object that includes the first mobile object that is stored in the storage mobile object and at least one second mobile object that is not stored in the storage mobile object, the destination including a delivery destination;

acquiring control information indicating a time at which to start or stop traveling and a travel speed, and controlling the first mobile object to autonomously travel to the destination in accordance with the acquired control information; and outputting information indicating that the first mobile object is in a state requiring maintenance based on a plurality of states of the first mobile objection, the plurality of states including estimating whether the first mobile object is dirty or wet, whether the travel speed has dropped by a predetermined percentage from a designated speed, and whether a state of charge or a fuel level is equal to or less than a predetermined amount.

13. The management method according to claim 12, further comprising controlling the storage mobile object to unload and deploy, at a predetermined location, the first mobile object that has been maintained.

14. The management method according to claim 13, further comprising controlling the storage mobile object to deploy the first mobile object that has been maintained in exchange for newly storing the stored mobile object.

15. The management method according to claim 13, further comprising controlling the storage mobile object to store the stored mobile object that is not storing a delivery article.

16. The management method according to claim 12, wherein a mobile object that can store only one stored mobile object traveling in a predetermined area is deployed as the storage mobile object in the predetermined area.

17. A mobile object comprising:

a storage configured to store a stored mobile object; and a controller, wherein the storage is configured to maintain the stored mobile object while storing the stored mobile object, and the controller is configured to control the mobile object to autonomously transport the stored mobile object that is stored in the storage while maintaining the stored mobile object based on destination information that specifies a destination from a management apparatus including the mobile object, the destination including a delivery destination, wherein the stored mobile object acquires information indicating a time at which to start or stop traveling and a travel speed, and is controlled by the controller to autonomously travel to the destination in accordance with the acquired control information, and wherein the controller is further configured to output information indicating that the stored mobile object is in a state requiring maintenance based on a plurality of states of the first mobile objection, the plurality of states including estimating whether the first mobile object is dirty or wet, whether the travel speed has dropped by a predetermined percentage from a designated speed, and whether a state of charge or a fuel level is equal to or less than a predetermined amount.

18. The mobile object according to claim 17, wherein the controller is configured to control the mobile object to deploy, at a predetermined location, the stored mobile object that has been maintained.

19. The mobile object according to claim 17, wherein the controller is configured to control the mobile object to deploy the stored mobile object that has been maintained in exchange for newly storing the stored mobile object.

20. The mobile object according to claim 19, wherein the controller is configured to control the mobile object to finish maintaining the stored mobile object that has been stored before newly storing the stored mobile object.

* * * * *